April 20, 1948. E. BUGATTI 2,439,794
MACHINE FOR CUTTING AND CHAMFERING METAL SHEETS
Filed Oct. 29, 1945 4 Sheets-Sheet 1
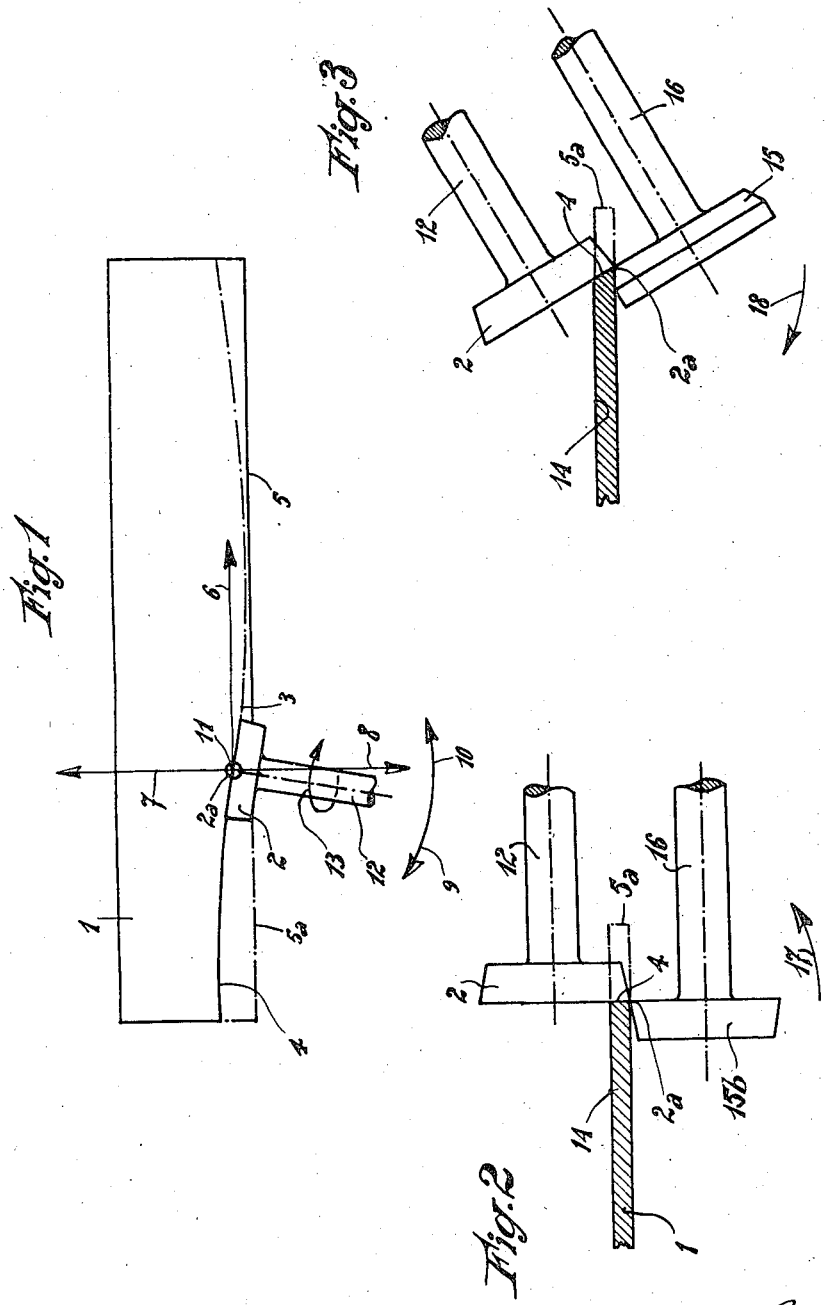

April 20, 1948.  E. BUGATTI  2,439,794
MACHINE FOR CUTTING AND CHAMFERING METAL SHEETS
Filed Oct. 29, 1945  4 Sheets-Sheet 2

Ettore Bugatti
by Mauro + Lewis
Attorneys

April 20, 1948.  E. BUGATTI  2,439,794
MACHINE FOR CUTTING AND CHAMFERING METAL SHEETS
Filed Oct. 29, 1945  4 Sheets-Sheet 3

April 20, 1948. E. BUGATTI 2,439,794
MACHINE FOR CUTTING AND CHAMFERING METAL SHEETS
Filed Oct. 29, 1945 4 Sheets-Sheet 4

Ettore Bugatti
by Mauro & Lewis
Attorneys

Patented Apr. 20, 1948

2,439,794

UNITED STATES PATENT OFFICE 2,439,794

MACHINE FOR CUTTING AND CHAMFERING METAL SHEETS

Ettore Bugatti, Paris, France

Application October 29, 1945, Serial No. 625,338
In France November 20, 1944

8 Claims. (Cl. 164—63)

Metal sheets used in the various operations connected with boiler-making and metallic construction (ship hulls, boilers, tanks, vats, tubulures, and the like) are generally subjected to an operation which consists in rectifying the laminated rough edges, and, as the case may be, chamfering the same. This operation in the case of very long metal sheets is performed by means of machines comprising a carriage which moves along the edge of the metal sheet to be cropped or chamfered. The carriage generally carries two circular knives or cutting-wheels, one of which at least is rotatively driven around its axis. The propulsion of the carriage is effected either by the reaction of the cutting-wheel on the metal sheet, or by any other known means.

Shears are also used which are fixed to carry out this operation, and the work is done by moving the metal sheet, which, however, is attended with certain disadvantages resulting from the space taken up, which is at least equal to double the length of the sheet iron, and from the difficulty in suitably guiding the conveying device along such a great length.

Furthermore, most of these machines, of whatever type they may be, unless they are provided with suitable devices for performing the chamfering, do not permit rectilinear cuts.

The object of this invention is to produce universal cropping and chamfering shears capable of cutting the metal sheets according to any outline, either rectilinear or sinuous, and to execute these cuts either perpendicularly to the surfaces or at a certain angle, in which case the cuts according to the outline and the chamfering at the requisite angle are produced in a single operation.

The following description, with reference to the accompanying drawing, given by way of non-limitative example, explains how the invention can be performed, whilst the distinguishing features, which are shown in the drawing and in the text, form naturally part of said invention:

Fig. 1 is a plan diagram of the principal movements of a cutting operation carried out according to the invention.

Fig. 2 is a similar diagram showing the profile cutting in the case of a cut perpendicular to the faces of the metal sheet.

Fig. 3 shows in a similar way the position of the cutting-wheels when the cutting is oblique (chamfering).

Fig. 7 shows on a large scale the constructional detail.

Figure 8:
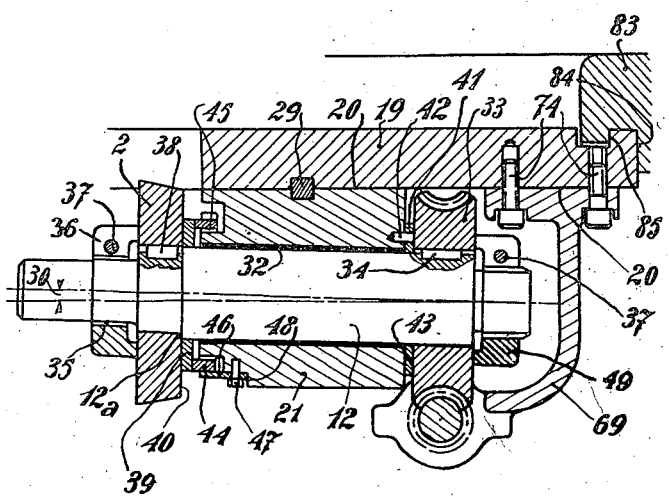

Fig. 8 also on a large scale is a horizontal cut along the axis of one of the cutting-wheels.

The metal sheet 1 (Fig. 1) is shown in plan. The upper cutting-wheel 2, which alone is visible, is in such a position that the cutting edge 2a is along the outline 3. This outline, in full lines in the left-hand side portion of figure, is merged in the edge just cut 4 of the metal sheet. In the right-hand side, a part of the outline 3, shown in dot-and-dash lines, is distinct from the edge 5, which is rough. The line 5a indicates the original shape of the metal sheet in the part already cut. The arrow 6 shows the direction of the movement of the cutting-wheel carrier, its frame and the transverse and longitudinal carriages, not shown in the figure, but referred to in the course of the specification. The arrows 7 and 8 indicate the directions of the movements of the cutting-wheel carrier, of its frame and of the transverse carriage. The arrows 9 and 10 show the direction of the displacements of the cutting-wheel carrier and of its frame around the pivot 11, the axis of which coincides with the projection of the contact point 2a of the cutting edge of the wheels with the outline 3. These displacements around the pivot 11 are controlled by the operator, whose duty consists in continuously keeping the axis of the cutting-wheel carrier shaft 12 normal to the curves of the outline 3, or perpendicular to said outline when it is rectilinear. The displacements following the arrows 7 and 8 are dependent upon the movements around the pivot 11, and their amplitude is directly connected with the arrow of the curves of the outline 3.

The wheel-carrying shaft 12 revolves in the direction of the arrow 13 so that its cutting-wheel 2 drives the shearing device in the direction of the arrow 6. This movement is effected on the running path of the longitudinal carriage.

The metal sheet 1 is shown in Fig. 2 in transverse section, and the upper cutting-wheel 2 and its shaft 12 are in such a position that the axis of said shaft 12 is parallel to the face 14 of the metal sheet 1. The lower cutting-wheel 15b and its shaft 16 occupy a position similar to that of the cutting-wheel 2 and its shaft 12. The edge 4 of the metal sheet 1 is, in this case, perpendicular to the face 14.

In order to reach the position shown in Fig. 3 (edge 4 of the metal sheet 1 inclined relatively to the face 14), it is necessary to cause the support of the cutting-wheels 2 and 15 to rotate by the requisite angle in its guide, and to immobilize it in this position. The arrows 17 and 18 indicate, in both cases, the direction of the movements to be performed around the centre 2a.

The cutting-wheel carrier 19 (Figs. 4, 5, 6, 7 and 8) has the shape of a notched disc, or, more simply, of a half-moon, and comprises a notch 19a adapted to allow the cutting-wheels 2 and 15 to cut at a certain distance from the edge 5a of the metal sheet 1. The depth of this notch 19a limits the capacity of the shearing in the transverse direction, but it is quite understood that a machine of this type is never used to cut sections; in such case use is made of rectilinear or guillotine shears, which are much better adapted to this kind of work.

Figure 4:
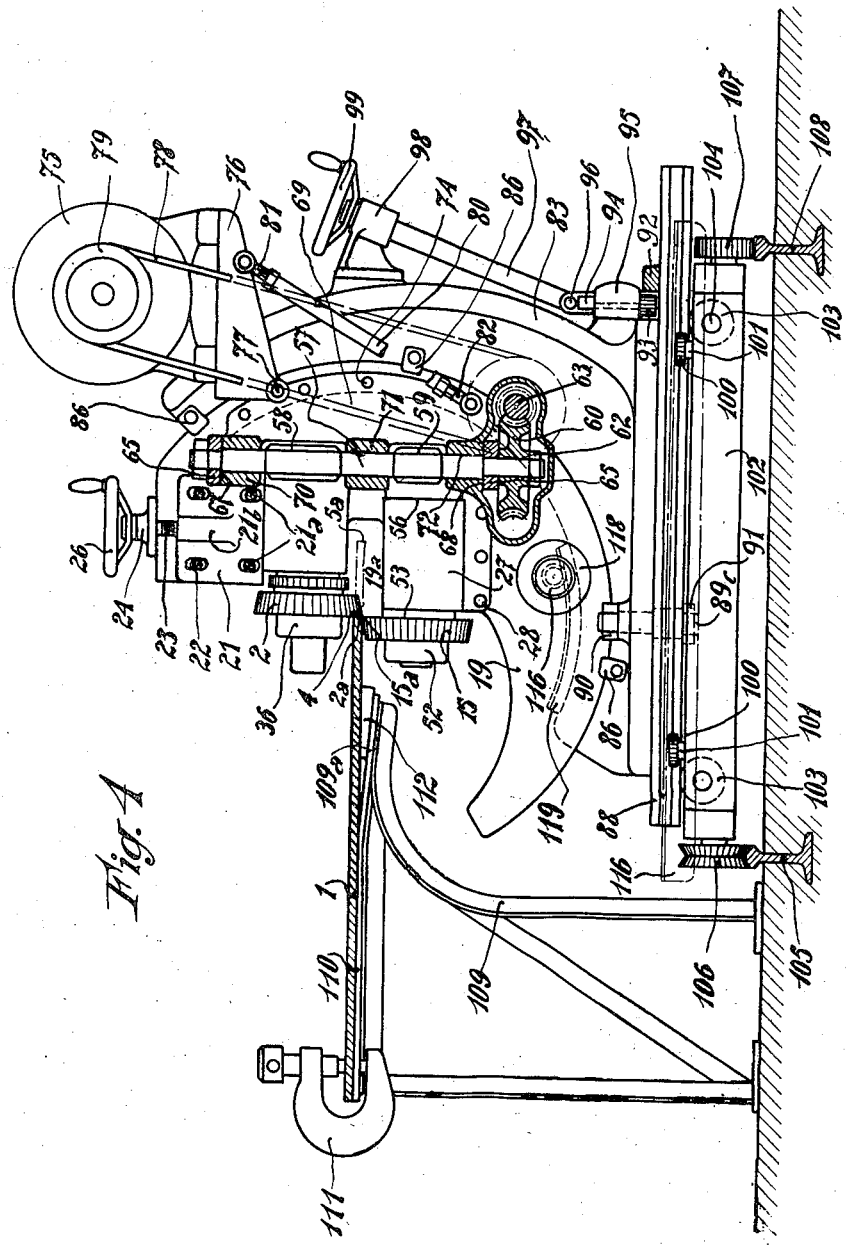
Fig. 4 is a profile view of the machine in partial sections.
Figure 5:
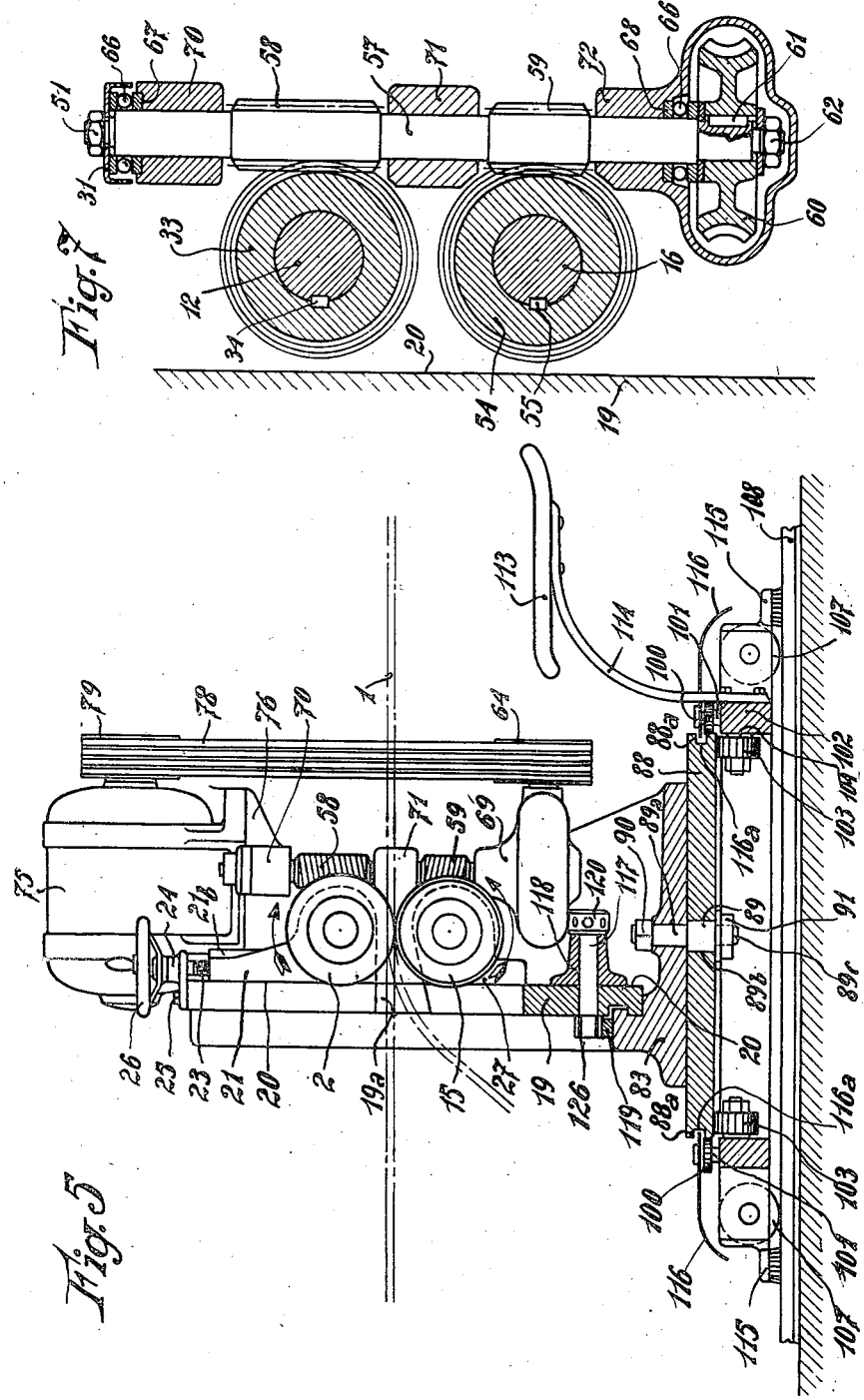
Fig. 5 is a front view of a portion of said machine.

The face 20 of the cutting-wheel carrier 19, which is in the front in Fig. 4, is machined so as to take up the support 21 of the upper cutting-wheel 2, which support is secured by a row of screws 22. The height of this support 21 is adjustable by means of stud holes 21a and by operating a suitable controlling device, as, for instance, a screw 23, guided by a support 24, which is fastened to the disc 19 by means of bolts 25, and a controlling wheel 26, fixed to the screw 23. This screw engages a threaded boss 21b of the support 21. This vertical adjustment is effected to bring the cutting edge 2a of the upper cutting-wheel 2 in contact with the edge 15a of the lower cutting-wheel 15 whenever the cutting-wheel 2 has been sharpened since sharpening causes a reduction of diameter. The edge 15a of the lower cutting-wheel may not be a cutting edge. After adjustment, the support 21 is immobilized by means of the screws 22, which are tightened or loosened as may be required.

The support 27 of the lower cutting-wheel 15 is fixed on the disc 19 by a row of bolts or screws 28. These supports 21 and 27 are guided in the vertical direction by feather keys 29 (Fig. 8), which ensure a correct position of said supports in case of refitting.

Furthermore, the support 21 has the peculiar characteristic (Fig. 8) of being bored along an axis which is not parallel to the face 20 of the disc 19. The angle 30 has a value of about one degree, the object of this being to facilitate the cutting action of wheel 2 because the plane faces of the cutting wheels are thus set at a small angle as are the blades of usual scissors for cutting cloth and such an arrangement is known to be favourable.

The shaft 12 of the upper cutting-wheel 2 revolves in a ring 32 (Fig. 8) fitted in the support 21. Shaft 12 carries a worm-gear 33, fixed thereto by keys 34; a threaded portion 35 takes up a pincer nut 36, tightened by a bolt 37, which serves to block the cutting-wheel 2 against a shoulder 12a; the cutting-wheel 2 is made fast with shaft 12 by a key 38. Any side play is taken up by washers or rings, one of which, 39, rubs against the inner face 40 of the cutting-wheel 2, and the other, 41, made fast with the support 21 by a pin 42, rubs against the face 43 of the worm gear 33. A nut 44, screwed on the threading 45 of the support 21, pushes the ring 39 against the face 40 of the cutting-wheel 2, and serves to adjust the position of said cutting-wheel in axial direction; a pin or finger 46 held by a screw 47 in a recess 48 provided in support 21 locks the nut 44 in its adjustment position. A second pincing nut 49 clamped by a bolt 37, is screwed on a screw-threaded end portion of shaft 12 and allows of adjusting axial play after the position of the cutting-wheel 2 has been adjusted as above stated.

The lower cutting-wheel 15 is keyed on its shaft 16, and it is blocked against a shoulder of said shaft 16 by a pincing nut 52 (Figs. 4 and 6) similar to the nuts 36 and 49 referred to in connection with the upper cutting-wheel 2. A ring 53 is arranged between the adjacent faces of the cutting-wheel 15 and the support 27; it is immobilized by any means (for instance, by a stop pin) on the support 27, and its other face rubs against the adjacent face of the cutting-wheel 15.

A worm gear 54 (Figs. 6 and 7), keyed at 55 on the shaft 16, transmits the movement to the cutting-wheel 15. Worm gear 54 rubs against the cheek 56 of support 27. A ball thrust bearing may be provided between these two elements in order to absorb the axial stress due to the operation of the cutting-wheel 15. A pincing nut, not shown in the drawings, makes it possible to adjust the axial play of the shaft 16 in the support 27 and keeps assembled the various elements dependent upon the support 27, in accordance with a constructional mode similar to that of the elements assembled with the support 21.

A single shaft 57 transmits the movement to the worm gears 33 and 54 through worms 58 and 59 which have opposite pitches so as to drive the cutting-wheels 2 and 15 in opposite directions to one another.

The shaft 57 is itself operated by a worm gear 60, keyed at 61, and locked by a nut 62 and a worm 63, which is fast with a pulley 64. The three worm and gear couples 33—58, 54—59 and 60—63 are calculated so as to considerably reduce the angular speed from pulley 64 so that the cutting wheels 2 and 15 revolve very slowly.

Figure 6:
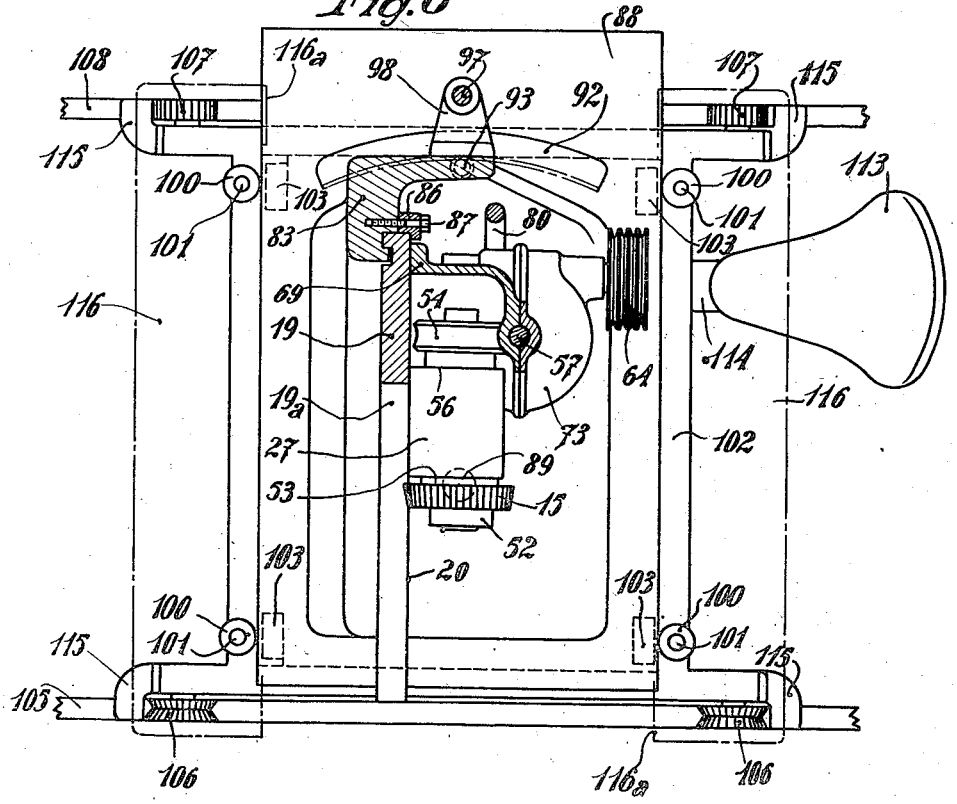
Fig. 6 is a plan view of the machine, partly cut off.

The axial thrust produced by worms 58 and 59 is absorbed by the friction rings 65 (Fig. 4), or by ball abutment or thrust bearings 66 (Fig. 7) resting on the upper faces 67 and the lower faces 68 of the casing 69. The upper ring 65, or the upper abutment 66, are held on the end of the shaft 57 by a protective ring 31 and a nut 51. The casing 69 comprises three bearings 70, 71 and 72 in which the shaft 57 revolves; in its lower part it is arranged to serve as a housing for the worm gear 60 and the worm 63. This casing 69 is made of two parts which are joined in a plane passing through the axis of the shaft 57, the second part forming a cover as indicated by the reference 73 (Fig. 6).

The system constituted by the casing 69, its cover 73, the shaft 57, the worms 58 and 59, the abutments 65 or 66, the worm gear 60, and the worm 63, is secured on the face 20 of the cutting-wheel carrier 19 by means of a row of screws or bolts 74.

The worm and gear couples 33—58, and 55—59 are not enclosed in the casing 69, considering that their very reduced rotary speed can do with little lubrication; only the couple 60—63, which revolves at a much higher speed, is confined in casing 69, which permits lubricating by splash lubrication, or even under pressure.

An electric motor 75 is fixed on a support 76.

pivotally borne on a pin 77, which is itself integral with the casing 69. Belts 78 which transmit the movement of the pulley 79 off the motor 75 to the pulley 64, are stretched by means of an adjustable leg 80 which for this purpose may comprise a pair of screws 81, 82 having opposite pitches.

The cutting-wheel support 19 revolves in the frame 83 in which it is guided by its cylindrical faces 84 and 85 (Fig. 8). A series of catches 86 (Figs. 4 and 6) distributed over the contact area of the cutting-wheel carrier 19 in the frame 83, hold, when they are blocked, by means of screws 87 penetrating the frame 83, the cutting-wheel carrier 19 in the angular position chosen in consideration of the angle at which it is desired to cut the metal sheet. The rotation of the cutting-wheel carrier 19 can be controlled by a pinion 126 (Fig. 5), integral with a shaft 117, revolving in a support 118, fixed on the face 20 of the cutting-wheel carrier 19, and a toothed sector 119, secured to the frame 83. The operation is carried out by using, for instance, the head 120 of the shaft 117, which head is provided with holes for that purpose.

The frame 83 is fixed by a vertical pivot 89 on a plate 88, which performs the duty of a transverse carriage. The pivot 89 is blocked by its upper part 89a and a nut 90 in the base of the frame 83. Its central part 89b revolves in a boring of the plate or carriage 88, and finally its lower part 89c is threaded to receive a nut 91 which is locked thereon in any manner that does not interfere with free rotation of frame 83 and pivot 89.

The device which controls this rotation comprises a toothed sector 92, integral with the plate-carriage 88, a pinion 93 which meshes with the sector 92, a spindle 94 revolving in a support 95, fixed to the frame 83, a casing 96, a shaft 97, a support 98, also fixed to the frame 83, and a hand-wheel 99, keyed on the shaft 97. This control is within the reach of the hand of the operator who works the machine, and is used, as has been explained in the course of the specification, for directing the cutting-wheels along the outline.

The transverse movements which allow the cutting-wheels to follow the outline are effected by the plate 88, which is guided for the purpose by four rollers 100, loosely mounted on spindles 101, arranged on a frame 102, which acts as a longitudinal carriage.

The load is carried by another row of rollers 103, revolving loosely around spindles 104, also provided on the frame 102. The latter runs over rollers 106 and 107 on rails, one of which 105 has an upwardly tapering cross section as shown. Two of the rollers, 106, for instance, have the shape of a double truncated cone corresponding to the profile of the rail 105, and they provide for the guiding of the carriage 102. The two other rollers 107 are cylindrical and run on the rail 108, the section of which is normal.

The two rails 105 and 106 are preferably embedded in the floor of the workshop.

A series of supports 109, made of profiled iron, are fixed at intervals along the rails 105 and 108. The iron sheet to be cut is laid on a backing plate 110 borne on supports 109 and clamped thereon by screw-clamps 111.

The shape of the supports 109 is adapted to their function; they preferably comprise a part 109a sloping towards the edge 4 of the metal sheet 1 so that the metal sheet 1 can be further held by wedges 112 driven between said metal sheet 1 and the plate 110 of the supports 109.

A seat 113, fixed to the frame 102 by a flat steel band 114, and possessing a certain resiliency, provides for the machine driver sitting in a suitable position to see the outline clearly, and direct the shearing with the aid of the wheel 99 and the control device above described.

Four metal brushes 115 may be fixed to the frame 102 so as to clean the tread surfaces of the rails 105 and 108, and particularly to remove the cutting waste.

It is possible to protect the various rollers which allows the displacements of the carriage 88 by two metal sheets 116, fixed on the frame 102, for example on the pivot pins 101 of the rollers 100. The edges 116a of metal sheets 116 engage recesses or grooves 88a in the vertical edges of plate 88.

This specification is brought to an end by a last observation concerning the comparative diameter of the cutting-wheels 2 and 15. The cutting-wheel 15 may with advantage have a diameter greater than that of the cutting-wheel 2, so that, the angular speeds being equal, the cutting-wheel 15, which is not generally active, ensures alone the progress of the shearing, and thus reduces the work imposed upon the cutting-wheel 2, upon its shaft 12 and upon its support 21.

It will readily be understood from the above description that after cutting wheels 2, 15 have been brought to nip a metal sheet 1 to be cut, at an end thereof, and motor 75 is in operation thus rotating the cutting wheels in opposite directions, the reaction of said cutting wheels on the metal sheet causes carriage 102 to roll on rails 105, 108; as the worker seated on seat 113 may cause the cradle 83 and hence the tool-carrier 19 to pivot at 89 by operating hand-wheel 99 and since the secondary carriage 88 may freely move on rollers 103 and between rollers 100 on the primary carriage 102; the worker may direct the cutting-wheels 2, 15—to follow the required line on the metal sheet 1. Furthermore he may initially adjust the position of tool-carrier 19 in its supporting cradle 83 (by operating head 120 on shaft 117), to set the axes of cutting-wheels 2, 15 to any requisite angle with respect to the plane of metal sheet 1, for instance with a view to obtaining a chamfered edge along the freshly cut sheet.

What I claim is:

1. In a machine of the type described having a bed, the combination of a main carriage adapted to travel on said bed; means for guiding said carriage on the bed along a rectilinear path; a secondary carriage on the main carriage adapted to travel thereon; means for guiding the secondary carriage along a transverse path on said main carriage; a pair of cooperating cutting wheels; means for revolubly supporting said cutting wheels from the secondary carriage, including swiveling means whereby the cutting wheels can move bodily about an axis at right angles to the bed; and means supported from the secondary carriage to impart rotary motion to said wheels in opposite directions.

2. In a machine of the type described having a bed and a support adapted to be moved in any direction parallel with said bed, the combination of a pair of revoluble cutting wheels arranged in substantially tangential relationship at a cutting point; a cradle which has a cylindrical guiding surface having its axis passing through said cutting point and parallel to said bed, said cradle being carried on said support and adapted for pivotal movement thereon about an axis which is at right angles to said support and passes through said cutting point; means—cooperating with said cylindrical surface to be guided thereby for swinging motion about the axis of said surface for revolubly supporting said cutting wheels from said cradle; and means carried from the wheel supporting means for imparting rotary motions to said wheels in opposite directions.

3. The combination of claim 2, which further comprises cooperating means on said support and cradle for manually turning the latter on the former about said pivotal movement axis; and cooperating means on said cradle and wheel supporting means for moving the latter in said cradle about the axis of the cylindrical surface.

4. The combination of claim 3, which further comprises cooperating means on said cradle and wheel supporting means for moving the latter in said cradle about the axis of the cylindrical surface, to any desired working position; and means for locking said wheel supporting means in said cradle in said working position.

5. In a machine of the type described, a tool carrying unit which comprises a crescent-shaped rigid disk having a cylindrical bearing surface, the axis of said cylindrical surface being at right angles to the plane of said disk and located on the concave side of said crescent-shaped disk; a pair of cooperating cutting wheels having their peripheries in substantially contacting relationship at a point which substantially coincides with the centre of said cylindrical bearing surface; means for rotatably supporting one of said wheels with its axis in substantially parallel relationship with the plane of said disk in a stationary position on said disk; means for rotatably supporting the other wheel on said disk in an adjustable position with respect to the first wheel with its axis in substantially parallel relationship with the plane of said disk; a motor supported on said disk; and transmission means between said motor and said wheels for rotating the latter, adapted and arranged to drive them in opposite directions at substantially equal peripheral speeds.

6. In a machine of the type described, the combination of a bed; a cutting wheel supporting carriage, adapted to travel on said bed; a pair of cooperating, revoluble cutting wheels; means for rotatably supporting one of said wheels from said carriage, with its axis parallel to said bed; and means for rotatably supporting the other wheel from said carriage with its axis parallel to said bed but at small angle with the first named axis.

7. A sheet metal cutting machine, which comprises a wheeled main carriage; a secondary carriage on the main carriage adapted to move thereon; means for guiding the secondary carriage along a fixed path on said main carriage; a pair of cooperating cutting wheels; means for revolubly supporting said cutting wheels from the secondary carriage, including swiveling means providing a pivotal axis at right angles to said secondary carriage for bodily movement of said cutting wheels; a motor supported from the secondary carriage to impart rotary motion to said cutting wheels in opposite directions; means including a hand control, for controlling said bodily movement of the cutting wheels about said pivotal axis; and a seat supported from said main carriage in the neighbourhood of said hand control.

8. In a machine of the type described, the combination of a carriage; a pair of revoluble, cooperating cutting wheels; means for supporting said cutting wheels on said carriage with the plane of their axes substantially perpendicular to said carriage, and for bodily rocking movement of said axes in said plane about an axis parallel to said carriage; and means carried from the first named means for imparting rotary motions to said cutting wheels in opposite directions.

ETTORE BUGATTI.

REFERENCES CITED

The following references are of record in the file of this patent:

FOREIGN PATENTS

| Number | Country | Date |
|---|---|---|
| 14,999 | Great Britain | Sept. 23, 1889 |